June 5, 1951 C. C. BUCKELS 2,556,061
JUNCTION BOX
Filed Oct. 3, 1945
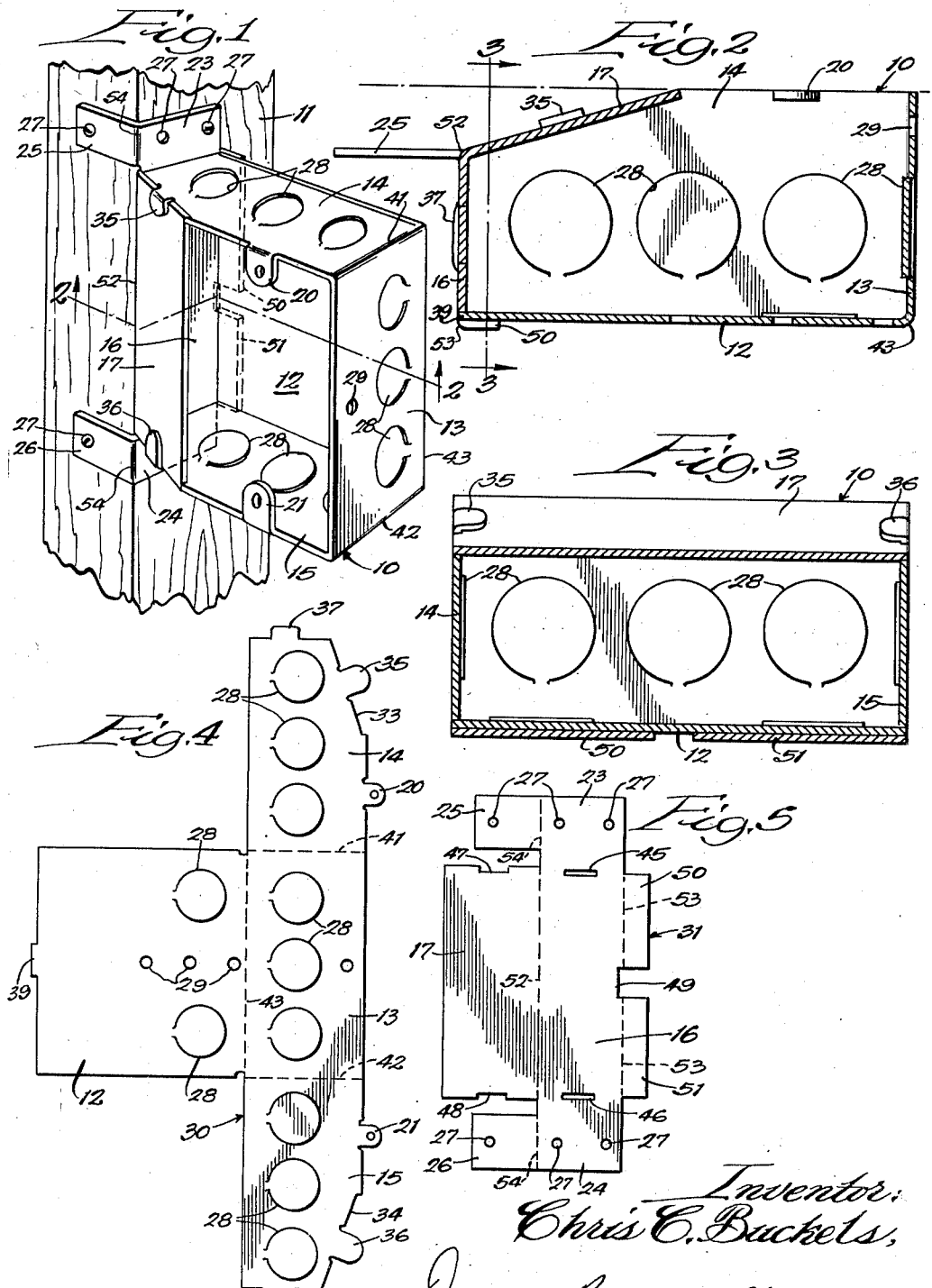
Inventor:
Chris C. Buckels,
By Dawson, Orth and Hugenberg,
Attorneys.

Patented June 5, 1951

2,556,061

UNITED STATES PATENT OFFICE 2,556,061

JUNCTION BOX

Chris C. Buckels, Chicago, Ill., assignor to Henry Hildebrandt, Chicago, Ill.

Application October 3, 1945, Serial No. 620,067

1 Claim. (Cl. 220—3.3)

This invention relates to improvements in outlet or junction boxes.

The principal object of this invention is to provide an improved outlet or junction box which may be easily and inexpensively manufactured and which may be readily mounted on a stud support with the open face thereof projecting forwardly of the stud support so that it is substantially flush with the surface of a finished wall including the stud support.

Other objects and advantages of this invention will become apparent to those skilled in the art upon reference to the accompanying specification, claim and drawing, in which—

Fig. 1 is a perspective view showing the outlet or junction box mounted on a stud support;

Fig. 2 is a sectional view taken substantially on the line 2—2 of Fig. 1;

Fig. 3 is a sectional view taken substantially on the line 3—3 of Fig. 2;

Fig. 4 is a plan view of the metal blank utilized for forming the rear wall, the top and bottom walls and one side wall of the outlet or junction box; and Fig. 5 is a plan view of a metal blank which is utilized for forming the other side wall, the partial front wall and the mounting brackets of the outlet or junction box.

The outlet or junction box is generally designated at 10 and it is shown in Fig. 1 to be mounted on a stud support 11 forming part of a finished wall. The junction box includes a rear wall 12, a side wall 13, top and bottom walls 14 and 15, a side wall 16, and a partial front wall 17. The partial front wall 17 extends rearwardly at an angle from the open face in the front of the junction box. The top and bottom walls 14 and 15 carry ears 20 and 21 which are bent into the open face of the junction box and which are utilized for mounting a surface plate, not shown.

The wall 16 and hence the junction box 10 is provided with mounting brackets 23 and 24 and these mounting brackets include extensions 25 and 26 bent outwardly at right angles so that the mounting brackets 23 and 24 may closely fit a corner of the stud 11. The mounting brackets 23 and 24 and the extensions 25 and 26 thereof are provided with suitable holes 27 by which the junction box 10 may be rigidly secured to the stud support 11.

The junction box is also provided with the usual knockouts 28 and may also be provided with holes 29 which may be utilized for mounting the junction box if it is desired to mount the same in a different manner.

The junction box 10 is formed from two metal blanks, generally designated at 30 and 31 in Figs. 4 and 5 respectively. The metal blank 30 includes the rear wall 12, one side wall 13, and the top and bottom walls 14 and 15. As will be noted in Fig. 4, the top and bottom walls 14 and 15 are provided with sloping edges 33 and 34 and these edges are provided with ears 35 and 36 respectively. The side walls 14 and 15 are also provided with projections 37 and 38 respectively and the rear wall 12 is provided with a projection 39.

In forming the metal blank 30 into various walls of the junction box 10, the top wall 14 is bent up along the dotted line 41. The bottom wall 15 is bent up along the dotted line 42, and the rear wall 12 is bent up along the dotted line 43. The rear wall 12 overlies the contiguous edges of the top and bottom walls 14 and 15.

The metal blank 31 provides the side wall 16, the partial front wall 17 and also the mounting brackets 23 and 24. The metal blank 31 includes slots 45 and 46 adapted to receive the projections 37 and 38 of the metal blank 30 and also includes notches 47 and 48 to receive the ears 35 and 36 respectively of the metal blank 30. The metal blank 31 also includes a notch 49 for receiving the projection 39 of the metal blank 30. The metal blank 31 also includes projections 50 and 51.

In forming the metal blank 31 into the partial front wall 17 and the side wall 16, the partial front wall 17 is bent up at an angle along the dotted line 52. The projections 50 and 51 are bent up at right angles along the dotted line 53 and the extensions 25 and 26 of the mounting brackets 23 and 24 are bent downwardly at right angles along the dotted line 54.

In assembling the two formed blanks 30 and 31 into the junction box, the projections 37 and 38 are inserted in the slots 45 and 46, the projection 39 enters the notch 49 and the projections 50 and 51 overlie the rear wall 12. At the same time the ears 35 and 36 enter the notches 47 and 48 respectively. The partial front wall 17 overlies the rearwardly extending edges 33 and 34 of the top and bottom walls 14 and 15 respectively. The ears 35 and 36 are then bent over onto the partial front wall 17 and the projections 37 and 38 extending through the notches 45 and 46 are peened. By bending of the ears 35 and 36, the peening of the projections 37 and 38, and due to the locking action of the projections 39, 50 and 51, the two metal blanks 30 and 31 are rigidly retained in assembled relation to form the outlet or junction box generally designated at 10 in Fig. 1.

By reason of the rearwardly extending partial front wall 17, the open face of the junction box projects or extends forwardly of the stud support 11 so that after lath and plaster are applied to the stud support 11 to form the finished wall, the open face of the junction box 10 will lie substantially flush with the completed wall. Also, by reason of the rearwardly extending partial front wall 17, the internal capacity of the junction box is quite large for the purpose of accommodating the wires entering into the box through the knockout holes 28.

While for purposes of illustration one form of this invention has been disclosed, other forms thereof may become apparent upon reference to this disclosure and, therefore, this invention is to be limited only by the scope of the appended claim and prior art.

I claim as my invention:

An enlarged outlet or junction box having a partial open face comprising a rear wall, a narrow side wall, a wide side wall, top and bottom walls corresponding in width to the wide side wall and having a sloping edge at the front edge on the side of the narrow side wall to correspond with the narrow side wall, a partial front wall corresponding to the sloping edge to provide the partial open face, and mounting brackets on the narrow side wall adjacent the partial front wall for mounting the outlet or junction box on a stud support with the narrow side wall in alignment with the stud support and with the partial open face projecting beyond the stud support, said rear, top, bottom and wide side walls being formed from a single blank and said narrow side wall, partial front wall and mounted brackets being formed from a single blank.

CHRIS C. BUCKELS.

REFERENCES CITED

The following references are of record in the file of this patent:

UNITED STATES PATENTS

| Number | Name | Date |
|---|---|---|
| 1,016,925 | Appleton | Feb. 13, 1912 |
| 1,604,516 | Jacobsen | Oct. 26, 1926 |
| 1,734,322 | Appleton | Nov. 5, 1929 |
| 1,808,011 | Barnett | June 2, 1931 |
| 1,963,951 | Bowers | June 26, 1934 |
| 2,214,968 | MacMillen | Sept. 17, 1940 |
| 2,320,621 | Lefebre | June 1, 1943 |